July 15, 1930. H. C. FRUEHAUF ET AL 1,770,572
SEMITRAILER SUPPORT
Filed Feb. 5, 1927 2 Sheets-Sheet 1

INVENTORS
HARVEY C. FRUEHAUF
FREDERICK MALCOLM REID
BY
ATTORNEY

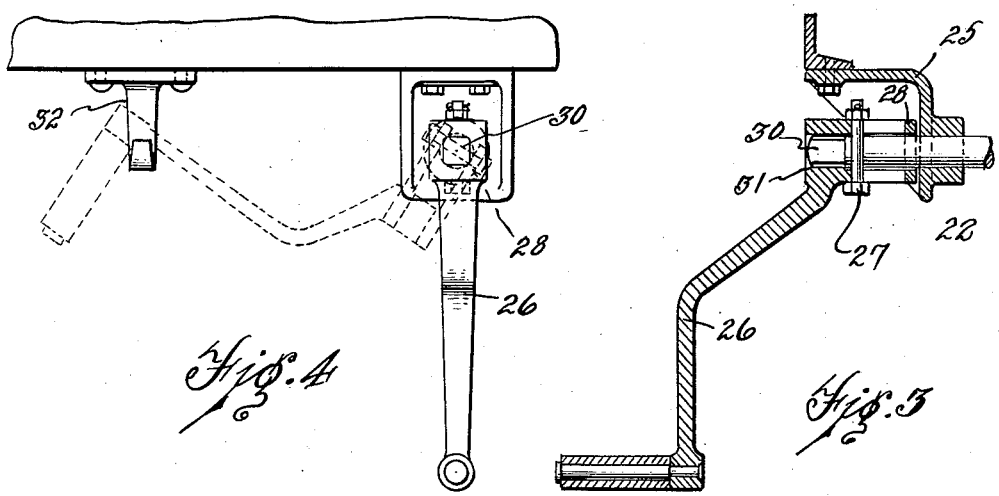
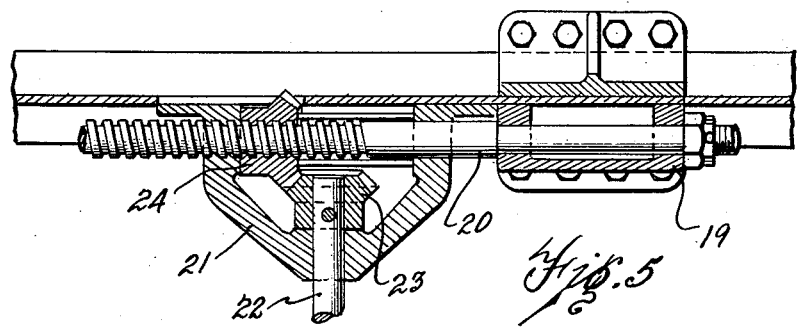
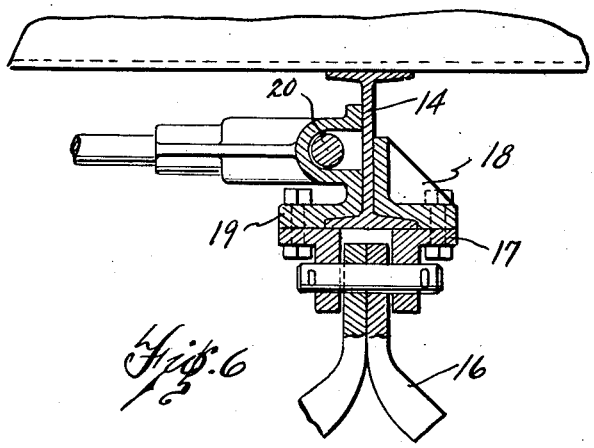

Patented July 15, 1930

1,770,572

UNITED STATES PATENT OFFICE

HARVEY C. FRUEHAUF AND FREDERICK MALCOLM REID, OF DETROIT, MICHIGAN, ASSIGNORS TO FRUEHAUF TRAILER COMPANY, OF DETROIT, MICHIGAN, A CORPORATION OF MICHIGAN

SEMITRAILER SUPPORT

Application filed February 5, 1927. Serial No. 166,063.

The present invention relates to semi-trailers, and it has to do more particularly with a semi-trailer support which supports the forward end of the trailer when the same is not in connection with a tractor or truck.

The invention is concerned particularly with a support of the hand operated type, that is, a support which is raised and lowered to and from operative position by manual operation. The invention contemplates a simple, rugged operating mechanism for raising and lowering the support which is positive in action, and not liable to get out of order. A novel arrangement is provided for locking the mechanism against movement so that the support is positively held in inoperative position, and the jolts and vibrations incident to the movement of the tractor cannot result in the dropping of the support toward operative position. Another thing which the invention contemplates is a support which is adjustable for height so that a nicety of operation may be had as between the semi-trailer and a particular tractor or tractors, and under prevailing conditions.

In the accompanying drawings:

Fig. 3 is a detail sectional view of the operating handle.

Fig. 4 is a side detail view of the operating handle showing in dotted lines the position of the handle in inoperative and locked position.

Fig. 5 is an enlarged sectional view taken on line 5—5 of Fig. 1 looking in the direction of the arrows.

Fig. 6 is a section taken on line 6—6 of Fig 1.

Figure 1:
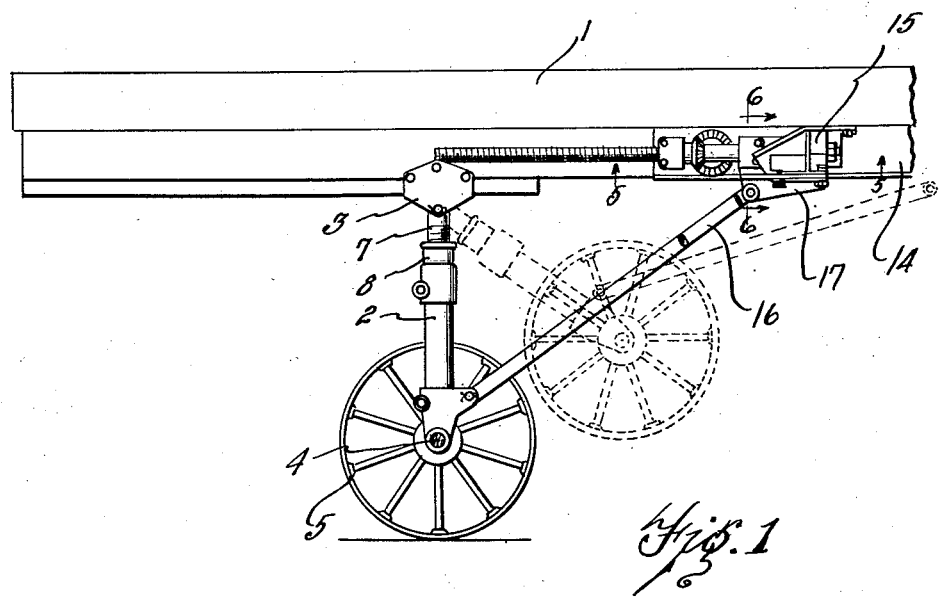
Fig. 1 is a side view of the forward end of a semi-trailer with parts cut away showing the support and showing in dotted lines the position of the support in inoperative position.

The frame of the semi-trailer is referenced 1 on the drawing, and the forward end of the trailer is adapted to be supported by a tractor when the same is in use. The trailer is secured to the tractor by a detachable connection such as a separable fifth wheel construction which is known to those versed in the art.

Figure 2:
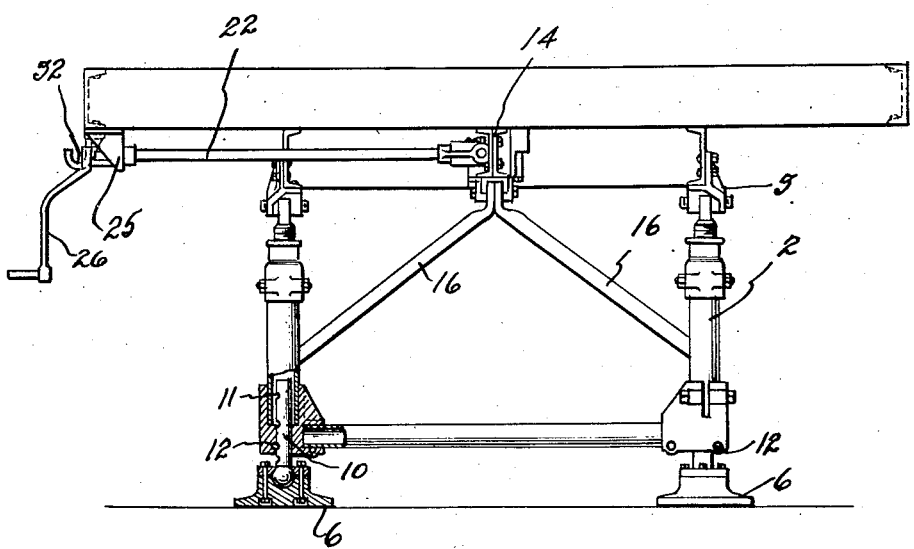
Fig. 2 is a front view of the support showing, however, the use of ground engaging feet in place of the wheels of Fig. 1.

The trailer support is constituted by legs 2, each of which is pivoted to a bracket 3, the brackets being in turn secured to the frame of the semi-trailer. These brackets preferably are of angle construction so as to embrace the frame members on their lower side and on one vertical side, as shown in Fig. 2. In Fig. 1 the legs 2 carry an axle 4 upon which are mounted wheels 5. With this construction the semi-trailer can be moved when on the support. The support, however, may be provided with feet 6 instead of supporting wheels, and these feet are preferably mounted on the supports by a ball and socket connection.

The legs 2 of the support are adjustable for height. For this purpose the legs of the support, which are provided with wheels, as shown in Fig. 1, include an exterior threaded member 7 and an internally threaded member 8. In order to make an adjustment with this construction the member 7, which is pivoted to the bracket 3, may be disconnected from the bracket and turned with respect to the member 8. Another way the adjustment can be made is by loosening the connection between the member 8 and the main leg member extending below the member 8, so that member 8 may be turned with respect to the threaded member 7. Adjustments for height need not be made frequently, since once a semi-trailer is properly adjusted for use with a particular tractor or tractors, or under a given set of conditions, such adjustment will be maintained over an extended period of time. For this reason the adjustment for height need not be of the type suitable for quick and frequent change.

With the footed form of support, rod-like members 10 may be used which project into the tubular supports 2. These members 10 are provided with a plurality of grooves 11, and they are secured to the supports by bolts 12 which extend through an angular fitting of the corner of the support and through one of the grooves. To make an adjustment for height the bolt is removed and the member 10 positioned so that a different groove aligns with the bolt 12. In this form the construction for connecting the supports 2 to the frame may be the same as that used in the form shown in Fig. 1.

For the purpose of moving the support to and from operative position, a reciprocating head 15 is provided, and this head is connected to the support by means of rods 16, the rods being pivoted both to the head and to the support. The head shown is one designed to reciprocate on an I-beam 14, and for this purpose the head includes a lower member 17 to which the rods are directly pivoted, and upper members 18 and 19 which are bolted to the lower member and which overlie the lower flange of the I-beam and embrace the web of the I-beam. For reciprocating the head on the I-beam an elongated screw member 20 is provided, and this member is securely fastened to the member 19, as shown in Fig. 5. Fixed to the I-beam is a bracket 21 which forms a bearing for an operating shaft 22 which is provided with a pinion 23. A pinion 24 which is provided with interior screw threads and mounted upon a screw 20, meshes with a pinion 23. The pinion 24 backs up against the bracket 21 and is held in fixed position.

The operating shaft 22 extends out to a point adjacent the side of the frame where it is supported in a bracket 25. A crank 26 is affixed to the end of the shaft 22 for rotating the same. The shaft 22 has a bolt 27 extending therethrough, and the crank has bifurcated portions 28, each of which is slotted, and the bolt 27 extends through the slots. The extreme end 30 of the shaft 22 is squared, and the interior portion 31 of the crank 26 is squared so that when the crank is in the position shown in Fig. 3 the shaft may be turned by rotation of the crank. It is advantageous to make the end of the shaft and a portion of the interior of the crank square for this purpose, although the two parts may be of hexagon shape or any other shape which will accomplish the same purpose. A hook 32 is secured to the frame and this hook is for the purpose of receiving the handle as shown in the dotted lines of Fig. 4.

It will be seen that by rotating the shaft 22 by the handle, that the pinions 23 and 24 rotate, and as the pinion 24 is fixed in position and the screw 20 held from rotation, the screw will be reciprocated to reciprocate the head 15 along the I-beam. This effects a raising and lowering of the support to and from the two positions shown in Fig. 1. When the support is in inoperative position, and the trailer is being drawn along the highway by a tractor it is desirable to lock the support so that the same will not move downwardly by reason of jolts and vibrations, and the handle construction is designed to accomplish the locking. Outward movement of the crank with respect to the shaft 22 is permitted by reason of the slots in the portions 28 of the crank. When the crank has been drawn outwardly, the portions 30 and 31 of the crank and shaft are disengaged, whereupon the handle may be turned to the position shown in the dotted lines of Fig. 4, and the handle placed in the hook 32. This locks the shaft 22 from rotation, thus positively assuring that the support will not drop downwardly. At the same time, the crank itself is placed in a position so that it does not project outwardly from the frame. This is important where the frame of the semi-trailer is quite wide. It will be noted that the bolt 27 does not take the strain incident to the turning of the shaft by the handle, because of the fact that the handle and shaft interlock at their respective squared portions. Of course, when the handle is in locked position the bolt functions to prevent rotation of the shaft.

We are aware of the fact that, heretofore, it has been proposed to raise and lower semi-trailer supports by means of a screw, but in these devices the screw remained stationary, bodily, and a head moved back and forth along the screw. In our case the screw is bodily reciprocated, and the construction facilitates the placing of the load on the I-beam upon which the head reciprocates. It will be noted that this screw does not function as a support for holding the trailer support upwardly, as this is accomplished entirely by the I-beam, and the screw serves only to reciprocate the head along the I-beam.

Claims:

1. In a semi-trailer support, the combination of a supporting structure movably connected to the semi-trailer frame, means for moving said supporting structure to and from operative position including a rotatable shaft having a squared end, a bolt extending through the shaft, a crank provided with a slot through which the bolt extends, said crank having a squared interior portion for fitting the square end of the shaft whereby the shaft may be partially withdrawn to disengage the squared portion and folded with respect to the shaft, and means for holding the crank in folded position to lock the supporting structure against movement.

2. In a semi-trailer support, the combination of a supporting structure movably connected to the semi-trailer frame, a reciprocable head reciprocable longitudinally in the semi-trailer, links connecting the head with the supporting structure for moving the same to and from operative position, a screw threaded shaft fixed to said head, and means for reciprocating said screw threaded shaft to move the supporting structure to and from operative position.

3. In a semi-trailer support, the combination of a supporting structure movably connected to the semi-trailer frame, a reciprocable head supported by a frame member and connected to the supporting structure by links, a screw threaded shaft fixed non-rotatively to said head, and rotatable means for reciprocating said shaft to reciprocate the head.

4. In a semi-trailer support, the combination of a supporting structure movably connected to the semi-trailer frame, a longitudinally reciprocable head supported by a frame member and connected to the supporting structure by links, a screw threaded shaft fixed to the head and prevented from rotation, an internally threaded pinion mounted on said shaft, means for rotating said pinion, and means for preventing movement of said pinion relative to the frame whereby said shaft may be reciprocated to move the supporting structure to and from operative position.

5. In a semi-trailer support, the combination of a suporting structure movably connected to the semi-trailer frame, means for moving said supporting structure to and from supporting position including a rotatable shaft, one end of which is positioned adjacent the side of a trailer frame, a crank having a hub portion for fitting over the end of the shaft, means extending through the shaft and hub portion for holding the crank on the shaft, the shaft and hub having apertures for accommodating said means, some of which are elongated to permit relative axial movement between the crank and shaft and interengaging means on the shaft and crank which are interengaged to secure them together against relative rotation upon transmission of rotary movement from crank to shaft, said interengaging means being disengaged upon axial movement of the crank as regards the shaft, in one direction, whereby the crank may be folded with respect to the shaft.

6. In a semi-trailer, a supporting structure movably connected to the trailer frame and movable to and from operative position, said structure comprising a vertical leg member said leg member including two elements screw threaded together to provide for a fine adjustment for the length of the leg, a ground engaging member including a post telescoped into the leg member, said post having a plurality of notches therein and means insertable in the leg member for engaging in one of the notches to hold the ground engaging member to the leg, thus affording a major adjustment for adjusting leg length.

In testimony whereof we have affixed our signatures.

HARVEY C. FRUEHAUF.
FREDERICK MALCOLM REID.